March 28, 1950     O. LINDFORS     2,502,098

VOLTAGE REGULATOR

Filed Feb. 9, 1945

INVENTOR.
ONNI LINDFORS
BY
ATTORNEY

Patented Mar. 28, 1950

2,502,098

UNITED STATES PATENT OFFICE 2,502,098

VOLTAGE REGULATOR

Onni Lindfors, Beloit, Wis., assignor to Fairbanks, Morse & Co., Chicago, Ill., a corporation of Illinois Application February 9, 1945, Serial No. 576,970

2 Claims. (Cl. 322—25)

This invention relates to improvements in the regulation of alternating current generators, and has particular reference to an improved generator output-voltage regulator of a character providing close control of the generator field excitation, and affording greater stability of generator voltage under wide variations in current and power factor of loads imposed on the generator.

The principal object of the invention is to provide an improved voltage regulator for alternating current generators, embodying an electronic rectifier in the generator output circuit, supplying direct current to the generator field windings for the excitation thereof, and control facilities in the circuit of the rectifier and field windings, affording inherent and automatic as well as facultative control of the field excitation current, whereby the generator output voltage may be determined and maintained substantially constant throughout wide variations in the current and power factor of the generator load.

Another object of the invention resides in the provision of a secondary source of generator field excitation current, as a battery, arranged in the circuit of the regulator and field windings, and operative to supply excitation current to the latter during the generator starting period and until the electronic rectifier becomes effective to supply the field current, the battery according to the present improvements, being retained in the regulator circuit through a controllable resistor device, for effecting battery charging during normal generator operation, and affording by its retention in the regulator circuit and through adjustment of the resistor device to determine the amount of charging current delivered to the battery, and hence the rate of battery charge, an additional and corresponding control of the amount of excitation current delivered to the generator field windings. Retaining the battery under charge in the regulator circuit, thus not only presents field excitation control through proportionment of the current supplied by the electronic rectifier, between the generator field and the battery, but affords increased stability of the regulator in its function to control the generator voltage responsively to changes in the indicated characteristics of the generator load.

A further object is attained in the provision in a regulator of the character indicated, including an electronic rectifier affording full-wave rectification in supplying direct current for generator field excitation, of a transformer of improved character, having primary voltage and current windings connected in the generator output circuit, and secondary windings in circuit with the full-wave rectifier and generator field, wherein the windings are so arranged on a three-leg transformer core structure as to result in improved regulation of generator voltage at no load and throughout the load range of the generator.

Yet another object resides in the provision of a generator voltage regulator embodying the improved field excitation control facilities hereinabove objectively indicated, which will function to regulate the voltage of an alternating current generator such that the resulting generator output characteristics are similar in marked degree, to those of a compound wound direct current generator and further, which is capable of effecting an increasing generator voltage output under an increasing load characterized by an abnormally low power factor.

Other objects and advantages afforded by the present improvements, will appear readily from the following description of one preferred embodiment of the invention, as exemplified in the accompanying drawing, wherein.

Figure 1:
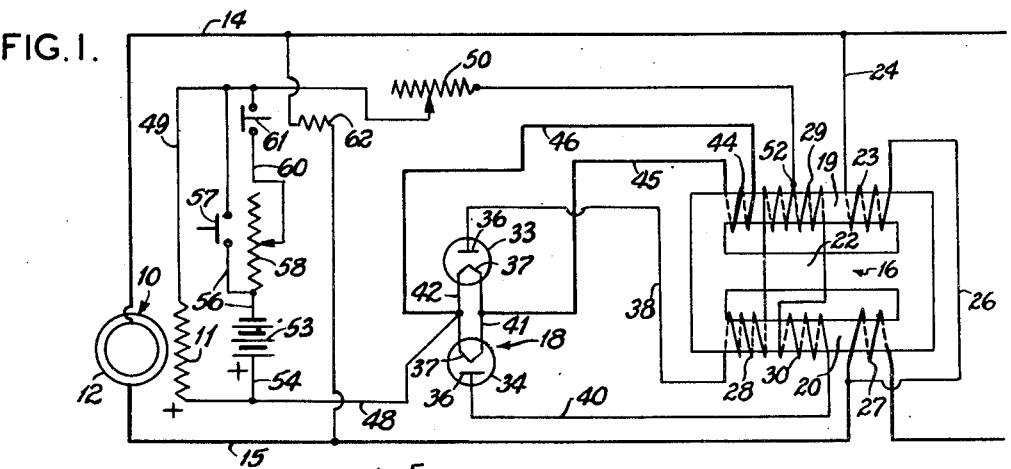
Fig. 1 is a circuit diagram of the improved regulator as adapted for the control of a single phase alternating current generator.

The regulator according to the present exemplary embodiment shown by Fig. 1 is adapted for application to a single phase alternating current generator, although it will become apparent as the description proceeds, that the regulator may be readily modified for application to generators of other than single phase type, as a three-phase generator, to obtain the same or a similar character of voltage control as afforded by the device now to be described.

Referring to the drawing by appropriate reference characters, there is illustrated at 10 a single phase alternating current generator driven by a suitable prime mover (not shown) and including a field winding 11 and a rotor or armature 12. The generator delivers alternating current through conductors 14 and 15 connected to the armature 12, to a power line or load (not shown). In normal operation, excitation of the field winding 11 is afforded by direct current derived from the generator output circuit, as the conductors 14 and 15, through a transformer 16 of presently improved character, and a rectifier 18, the latter preferably being of an electronic type and providing full wave rectification, as will hereinafter appear.

Transformer 16 provides a magnetic core structure, preferably of a suitable laminated construction, having parallel outer legs 19 and 20, and a center leg 22 paralleling the other legs. Arranged on the outer leg 19 is a primary winding 23 of a predetermined number of turns, connected in shunt with the generator output leads 14 and 15 through conductors 24 and 26 respectively. A further or second primary winding 27, also of predetermined number of turns, is located on the opposite outer leg 20, and is connected in series with the generator output lead 15, as shown. The transformer secondary winding is provided by a number of series-connected coil sections here shown as three, indicated at 28, 29 and 30, distributed on the outer legs of the core such that the end sections 28 and 30 are on core leg 20, and the center section 29 on core leg 19. These secondary coils are in circuit with a full wave rectifier of electronic type, indicated generally at 18.

The rectifier 18 comprises a pair of thermionic tubes 33 and 34 each of a diode type, providing a plate or anode element 36 and a heating filament or cathode element 37. Tube 33 has its anode 36 connected by a conductor 38, with the free end of transformer secondary coil 28, while tube 34 has its anode 36 connected by a conductor 40, with the free end of secondary coil 30. The filaments or cathodes 37 of the two tubes are connected in parallel by conductors 41 and 42, and are energized from a suitable source of heating current, as a transformer tertiary winding or coil 44 preferably arranged on the transformer leg 19 and connected by conductors 45 and 46 with cathode conductors 41 and 42 respectively.

From the rectifier cathodes 37 extends a field current supply conductor 48 which is connected to the positive end of the generator field winding 11, the negative or field-return circuit being provided by a conductor 49 including in series therein, an adjustable field rheostat 50, the conductor extending to a connection at 52 with the center coil 29 of the transformer secondary winding. The connection at 52 on coil 29, is selected such that it constitutes a center-tap relative to such coil, and by preference, also represents a connection at the mid-point of the predetermined total turns afforded by the three series-connected coils of the transformer secondary winding.

The generator voltage regulator as thus far described, is responsive automatically and inherently by reason of the improved transformer construction including the arrangement of the windings thereof, to changes in the characteristics of the generator load such as to produce corresponding and practically instantaneous adjustments in the effective value of the generator field excitation current, whereby to maintain the generator voltage substantially constant. The transformer primary winding 23 in shunt with the generator armature through conductors 14 and 15, affords under conditions of normal generator operation at no load, sufficient excitation of the transformer secondary winding and rectifier cathode heating coil 44, to produce operation of the rectifier and thereby to deliver excitation current to the generator field winding, of a value as regulated by the field rheostat 50, to establish the desired or normal rated potential of the generator. As load is applied, the load current traversing the transformer primary current winding 27, excites the winding to produce a flux flow in the transformer core of a value in direct proportion to the value of the load current.

Considering the function of the regulator to control the voltage applied to the rectifier anodes or plate elements, so as to determine thereby the current supplied to the generator field 11, the regulator and rectifier become fully operative following starting of the generator as the latter is facilitated by field excitation from a secondary source of field current, as a battery hereinafter to be referred to in connection with regulation of regulator compounding. During no-load starting and as the generator voltage builds up to normal rated value, such rising voltage will appear across the shunt primary winding 23 of the regulator transformer. Referring to the vector diagram of Fig. 2, the voltage of winding 23 is represented by the vector $E_s$, and this winding produces flux of corresponding value, traversing the core leg 19 and continuing in the closed circuits of the core structure, dividing in the center leg 22 and opposite outer leg 20 substantially in proportion to the relative sectional areas of these legs. The flux in leg 19 on which the winding 23 appears, is 90 degrees out of phase with the voltage $E_s$, and is represented by the flux vector $F_s$. Flux $F_s$ then induces in the center-tapped secondary winding 29 on core leg 19, a voltage $E_a$ opposite to voltage $E_s$ and in direct proportion to the value of the latter voltage. At the same time, the portion of flux $F_s$ traversing the opposite outer core leg 20, induces in secondary windings 28 and 30 corresponding voltage components in phase with voltage $E^a$. Thus the vector sum of these voltage components, represented by $E_b$, when added to voltage $E_a$, thereby desirably increases the voltage applied to the rectifier plate elements in the starting period, so as to facilitate quick starting of the rectifier as normal generator line voltage is attained. The rectifier thus energized and attaining normal operation with the cathodes heated from transformer coil 44, then provides field current sufficient to excite the field winding 11 such as to maintain the no-load generator voltage substantially constant at the desired value determined by proper adjustment of the field rheostat 50.

Upon application of a load on the generator and considering for present example, a load characterized by a power factor of less than unity, so that the load current is out-of-phase with or lags the generator voltage $E_s$, the load current traversing the series primary winding 27, may be represented by the current vector $I_L$. The series winding thus excited, produces an in-phase flux $f_s$ in the core leg 20, which flux induces in secondary windings 28 and 30 a total voltage represented by the vector $E'_b$ normal to the flux vector $f_s$. Consequently, the vector sum of the voltage $E_a$ of secondary coil 29 and the voltage $E'_b$, produces a resultant voltage $E_r$ greater than either of the components. The resultant voltage $E_r$ then becomes applied to the rectifier plates to effect a corresponding current supply to the generator field winding 11. Now as the load current $I_L$ changes in value, increasing or decreasing as the case may be, the induced voltage $E'_b$ will increase or decrease proportionately, so that in vector summation with induced voltage $E_a$, the resultant voltage $E_r$ will assume a correspondingly greater or lesser value, to result in an increase or decrease in field excitation current. Consequently, the generator excitation is thereby regulated such as to maintain the generator output voltage substantially constant under varying load current.

Figure 2:
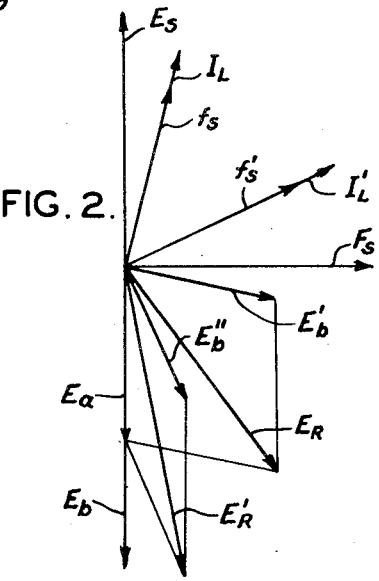
Fig. 2 is a vector diagram illustrating the character of field excitation control herein afforded.

With further reference to the vector diagram of Fig. 2, generator field excitation is additionally regulated such as to maintain a relatively constant generator voltage in response to alterations in the power factor of the load. Considering a relatively low power factor load producing a current flow $I'_L$ of a value corresponding to that of the current $I_L$ for example, the flux $f'_s$ then resulting in the core leg 20, induces in secondary windings 28 and 30 a total voltage represented by the vector $E''_b$. Consequently, vector addition of $E''_b$ and $E_a$ produces the resultant voltage $E'_r$ which is applied to the rectifier anodes to result in generator field excitation such as will maintain the generator voltage as above indicated. The foregoing control, it may be noted, is attained under changing load power factor conditions in respect to either leading or lagging current, as this will be now appreciated.

The regulator accordingly, supplies from the generator output circuit and through the rectifier, a regulated direct current for the field winding of the generator, and operates automatically and inherently to adjust the value of the field current in direct proportion to changes in current and power factor of the load imposed on the generator, whereby to maintain the generator voltage at the desired constant value. In fact, the character of regulation attained is such as to afford a generator voltage characteristic following very nearly that obtained in a compound-wound direct current generator.

As is well known, a generator of the character herein described, is not self-starting; that is, in the starting phase, there is insufficient residual voltage to activate the rectifier tubes. Hence, at starting, it is necessary to provide a source of direct current to afford normal field excitation, and this in the present example, is attained by a suitable battery 53 arranged for direct shunt connection with the generator field winding 11. As appears in the circuit shown in Fig. 1, the positive side of the battery is connected by a lead 54 to the conductor 48 extending to the positive side of the field winding 11, while from the negative side of the battery extends a conductor 56, leading to the conductor 49 extending from the negative side of the field winding. Included in conductor 56 is a starting switch 57. Connected to conductor 56 at a point between the starting switch and battery, is a battery charging resistor 58 of an adjustable type, and connecting the resistor to field lead 49 is a conductor 60 having therein a control switch 61. Switch 61 is of an electromagnetic type, having its operating coil 62 in shunt with the generator output circuit, as shown, and is adapted as a low-voltage release switch to open the charging resistor circuit when the generator output voltage drops below a predetermined minimum, such as occurs of course, when the generator operation is stopped. The starting switch 57 is manually actuated and retained in closed position only during the generator starting period, whereby to impose full battery current on the generator field winding 11, to effect rapid build-up of the generator output voltage to the desired or rated potential value. As normal generator voltage is attained, the regulator transformer becomes sufficiently energized to effect heating of the rectifier tube cathodes through transformer tertiary winding 44, and thus to start the rectifier. The transformer and rectifier thereafter provide field excitation current to the generator field winding, whereupon the starting switch 57 may be released or opened. During starting and as the generator voltage increases, the low voltage switch 61 closes the circuit of the charging resistor 58, but while the starting switch is closed, the resistor is thereby shunted to render it ineffective at this time. However, following the starting period and when the starting switch is opened, the resistor 58 then becomes effective to determine the value of the charging current delivered to the battery from the transformer and rectifier output. Normally, the resistor is adjusted to afford no more than a trickle charge of the battery, but as will be now appreciated, retention of the battery in shunt with the generator field through the adjustable resistor 58, affords a means for further and facultative regulation of the generator field excitation. By appropriate adjustment of the resistor 58, more or less current may be delivered to the battery, thus effecting a corresponding decrease or increase in the current flow through the generator field winding 11. Thus the degree of generator voltage compounding as determined automatically by the regulator transformer in response to changing characteristics of the generator load, may be additionally controlled through adjustment of battery charging resistor 58.

Leaving the battery in circuit under regulated trickle charge during normal operation of the generator, not only serves to assure a fully-charged battery ready at all times for generator starting, but contributes materially to the attainment of a stable generator function, particularly at no load, and affords as above described, facultative regulation of the generator field excitation. In fact, through the automatic function of the improved regulator, and by appropriate adjustment of the battery charge resistor 58, the generator output characteristics may be determined such that under loads of very low power factor, the generator voltage will rise perceptively as the load is increased up to and even somewhat above the full load capacity of the generator.

Figure 3:
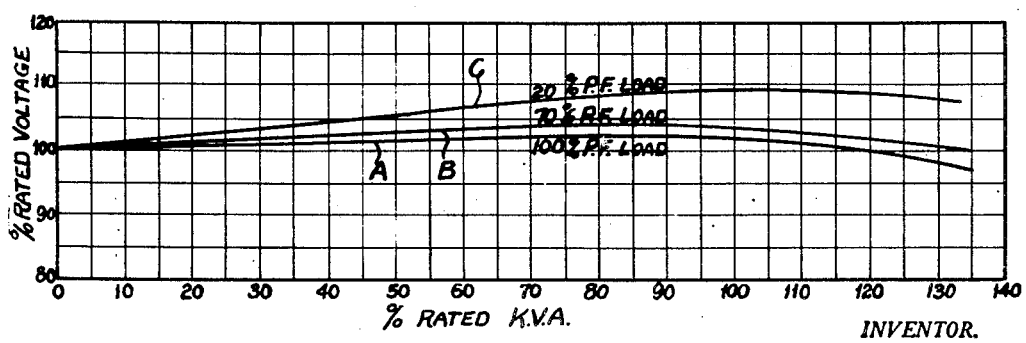
Fig. 3 is illustrative of the character of generator voltage control attained by the regulator, presenting output voltage curves obtaining under increasing loads of differing power factor.

Fig. 3 illustrates graphically, the character of voltage regulation attained by the present improvements. From a 100 percent rated voltage at no load, the generator voltage follows the curve A under increasing load characterized by a power factor of 100 percent, rising only slightly as shown, but for all practical purposes remaining substantially constant throughout the load range. Curve B illustrates the relatively constant generator voltage obtaining throughout the load range under a load of 70 percent power factor, while curve C indicates the degree of voltage rise under increasing load characterized by a very low power factor, as of the order of 20 percent. In the latter case, the voltage rise is considerably more marked than in either of the first two instances, presenting a voltage characteristic which is desirable with low power factor loads.

It now will appear that the regulator of the improved character described including the generator field excitation control afforded by the battery and its charging resistor in the field circuit presents a highly effective and stable device for maintaining a substantially constant generator output voltage under changing load conditions. It has been found in practice, that in the instance of relatively small generators equipped with the regulator, rapid build-up of loads supplied by the generator do not result in inordinate generator voltage disturbances. This factor is important to the effective starting of loads such as motors, and tests have shown that in the starting of a motor having a power rating as large as the output power rating of the generator, there occurred voltage disturbances of less than 15 percent.

While but a single preferred embodiment of the invention is herein illustrated and described, certain modifications may be made therein, as to the regulator construction and circuit arrangement to adapt the regulator to generators of three-phase type, for example, without departing from the spirit and intended scope of the invention, as defined by the appended claims.

I claim:

1. In an electrical system for regulating the voltage of an alternating current generator having a field winding and an output circuit, the combination of a storage battery and an adjustable resistance in shunt to the generator field winding, and means comprising a transformer and a full wave rectifier in circuit between the generator output circuit and said battery and resistance in shunt to the generator field winding, for supplying current to said battery and field winding, wherein said transformer comprises a closed magnetic core having a center and two parallel outer legs, a primary winding on one outer leg, a second primary winding on the other outer leg, and secondary windings on the two outer legs, said center leg being free of any winding.

2. In an electrical system for regulating the voltage of an alternating current generator having a field winding and an output circuit, the combination of a storage battery and an adjustable resistance, in shunt to the field winding, and means comprising a transformer and a full wave rectifier in circuit between the generator output circuit and said battery and resistance in shunt to the field winding, for supplying current to the field winding and said battery in parallel during normal operation, wherein said transformer comprises a closed magnetic core having a center and two outer parallel legs, a primary winding and a pair of secondary windings on one outer leg, a second primary winding and a pair of secondary windings on the other outer leg, the center leg being free of any winding, and one winding of each pair of secondary windings being connected in series with a winding of the other pair.

ONNI LINDFORS.

REFERENCES CITED

The following references are of record in the file of this patent:

UNITED STATES PATENTS

| Number | Name | Date |
|---|---|---|
| 1,572,959 | Rudenberg | Feb. 16, 1926 |
| 1,815,842 | Gay | July 21, 1931 |
| 1,850,734 | Thorne | Mar. 22, 1932 |
| 2,146,779 | Swanson | Feb. 14, 1939 |